United States Patent [19]

Omata et al.

[11] Patent Number: 4,939,023

[45] Date of Patent: Jul. 3, 1990

[54] OPTO-MAGNETIC RECORDING MEDIUM

[75] Inventors: Hiroshi Omata; Shigeharu Iijima, both of Kawasaki; Eizou Sasamori, Yokohama; Katsuhiko Takano, Yokohama; Eiichi Fujii, Yokohama; Ichiro Saito, Kawasaki; Yoichi Osato, Yokohama, all of Japan

[73] Assignee: Canon Kabushiki Kaisha, Tokyo, Japan

[21] Appl. No.: 233,921

[22] Filed: Aug. 18, 1988

Related U.S. Application Data

[63] Continuation of Ser. No. 763,212, Aug. 7, 1985, abandoned.

[30] Foreign Application Priority Data

Aug. 13, 1984 [JP] Japan .................. 59-169517
Oct. 1, 1984 [JP] Japan .................. 59-204109

[51] Int. Cl.$^5$ ............................................. G11B 7/24
[52] U.S. Cl. ................................ 428/215; 428/336; 428/694; 428/698; 428/900
[58] Field of Search ............. 428/694, 900, 215, 698

[56] References Cited

U.S. PATENT DOCUMENTS

| | | | |
|---|---|---|---|
| 4,370,931 | 1/1983 | Mori et al. | 428/702 |
| 4,414,650 | 11/1983 | Ohta et al. | 365/122 |
| 4,461,807 | 7/1984 | Mori et al. | 428/701 |
| 4,544,443 | 10/1985 | Ohta | 156/643 |
| 4,544,602 | 10/1985 | Kobayashi | 428/336 |
| 4,562,105 | 12/1985 | Machida et al. | 428/172 |
| 4,569,881 | 2/1986 | Freese | 428/213 |
| 4,639,816 | 1/1987 | Tomita | 360/131 |
| 4,670,322 | 6/1987 | Nakamura et al. | 428/172 |
| 4,670,323 | 6/1987 | Nakamura et al. | 428/172 |

FOREIGN PATENT DOCUMENTS

| | | |
|---|---|---|
| 59169996 | 4/1982 | Japan . |
| 116990 | 7/1984 | Japan . |
| 121368 | 7/1984 | Japan . |

OTHER PUBLICATIONS

Cuomo et al., IBM Technical Disclosure Bulletin, vol. 16, No. 5, Oct. 1973.

*Primary Examiner*—Marion C. McCamish
*Assistant Examiner*—Dennis Carmen
*Attorney, Agent, or Firm*—Fitzpatrick, Cella, Harper & Scinto

[57] ABSTRACT

There is disclosed an optical recording medium provided with an optical recording layer on a substrate, in which a layer of nitride of a substance selected from tungsten, zirconium, titanium, niobium, vanadium, tantalum and chromium is formed on a side or both sides of the optical recording layer.

19 Claims, 3 Drawing Sheets

OPTO-MAGNETIC RECORDING MEDIUM

This application is a continuation of application Ser. No. 06/763,212 filed Aug. 7, 1985, now abandoned.

BACKGROUND OF THE INVENTION

1. Field of the Invention

The present invention relates to an optical recording medium capable of signal recording and regeneration with an optical beam.

2. Description of the Prior Art

As an optical recording medium or a recording layer thereof for use in an optical disk, there are already known a rare earth-transition metal alloy film, a reducible oxide film utilizing phase transition from amorphous state to crystalline state of a charcogenide compound, a heat-mode recording medium, a thermoplastic recording medium etc. For example, a magnetooptical recording medium of a rare earth-transition metal alloy film can be composed of a polycrystalline film such as MnBi or MnCuBi, an amorphous film such as GdCo, GdFe, TbFe, DyFe, GdTbFe or TbDyFe, a single crystal film such as GdIG.

Among these recording medii, the aforementioned amorphous films are recently considered suitable as a photothermal recording medium, in consideration of the film forming property at the preparation of a film of a large area at an almost ambient temperature, the signal recording efficiency for recording a signal with a small photothermal energy, and the signal readout efficiency for reading the recorded signal with a high S/N ratio. Among said materials GdTbFe is suitable for use as a magnetooptical recording medium because of a large Kerr angle of rotation and a Curie point in the range of 150° C. Also the present inventors have found, as a result of investigation for increasing the Kerr angle of rotation, that GdTbFeCo provides a magnetooptical recording medium with a sufficiently large Kerr angle of rotation and enabling signal readout with a high S/N ratio.

However the amorphous magnetic materials employed in the magnetic recording medii, including the magnetooptical recording medii, such as the aforementioned GdTbFe, are generally associated with a drawback of poor anticorrosive property. In contact with air or water vapor, such materials show a deterioration in the magnetic properties therefore and eventually become transparent by complete oxidation. This drawback is commonly found not only in the magnetooptical recording medii but also in the aforementioned optical recording medii. Particularly, in a construction wherein a reflecting layer or an interference layer and a reflecting layer are provided on the back of a magnetic recording layer with a view to improve the S/N ratio, the thickness of the magnetic recording layer is limited to 500 Å or less due to the necessity of effectively utilizing the Faraday effect and therefore, the corrosion resistance is more aggravated. Also, such deterioration of the recording characteristic by oxidation has been a disadvantage common to opto-magnetic recording mediums and optical recording mediums.

In order to avoid such drawback there has been proposed to add an element such as Si, Cr, Ti, Ni, Co to the magnetic recording layer, to cover the recording layer with a transparent protective layer composed for example $SiO_2$ or SiO, an air sandwich structure in which the recording layer is sealed with an inert gas, or a laminated structure in which another substrate is adhered onto the protective layer by means of an adhesive material, but such structures have been unable to provide a sufficient anticorrosive property.

SUMMARY OF THE INVENTION

The object of the present invention is to provide an optical recording medium which is improved in the anticorrosive property thereof without loss in the signal recording properties.

The foregoing object can be achieved, according to the present invention, in an optical recording medium composed of an optical recording layer formed on a substrate, by forming a layer of nitride of a substance selected from a group consisting of tungsten, zirconium, titanium, niobium, vanadium, tantalum and chromium on one side or both sides of said optical recording layer.

The above-mentioned nitride layer can be formed by vacuum evaporation or sputtering. Particularly the layer of tungsten nitride, zirconium nitride, vanadium nitride or tantalum nitride can be advantageously formed by high frequency (RF) sputtering or reactive RF sputtering, while the layer of titanium nitride or niobium nitride can be advantageously formed by reactive evaporation or reactive RF sputtering.

In the present invention, in case the nitride layer is formed subsequent to the formation of the optical recording layer, it is desirable to form the nitride layer in continuous manner without breaking vacuum, after the recording layer is formed for example with sputtering. Also in case a nitride layer is formed on a substrate and then an optical recording layer is formed thereon, it is desirable to conduct said layer formations in continuous manner in the same tank without breaking vacuum.

It is another object of the present invention to provide an optical recording medium which is excellent in optical effect and good in recording sensitivity as well as excellent in corrosion resistance as compared with the conventional recording mediums.

The last mentioned object of the present invention can be achieved by an optical recording medium characterized in that at least an optical recording layer and a film of chromium containing nitrogen atoms in a chemically coupled state are provided on a substrate.

The film of chromium containing nitrogen atoms in a chemically coupled state is preferably a film of chromium nitride, but the form of chromium nitride may be any of four nitrides, i.e., $Cr_2N$, $CrN$, $Cr_3N_2$ and $Cr_3N$, or may be a form corresponding to the mixed composition of these, and any nitride having a transmitting property with respect to the light used may be used and most preferably, the film is a film of chromium nitride in the form of CrN.

The foregoing and other features and advantages of the present invention will become apparent from the following more particular description of preferred embodiments of the present invention as illustrated in the accompanying drawings.

DESCRIPTION OF THE PREFERRED EMBODIMENTS

Figure 1:
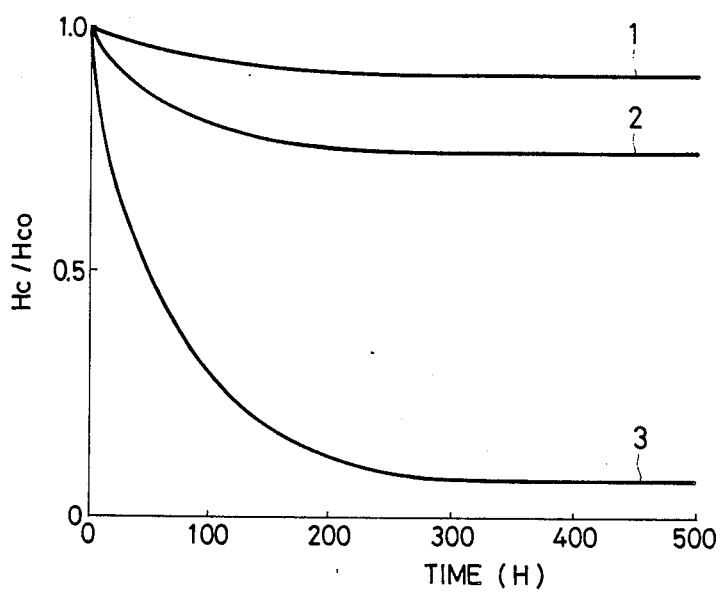
FIGS. 1 and 2 are charts showing the results of anti-corrosion tests on optical recording medii prepared according to the present invention.

Now the present invention will be clarified in greater detail by embodiments thereof.

EXAMPLE 1

An iron-free glass of 1 inch square was placed as a substrate in an RF sputtering unit, and a sputtering operation was conducted with a complex target composed of an iron piece of 100 mm$\phi$ on which small pieces of gadolinium and terbium in 5 mm squares are uniformly placed, thereby forming, on said substrate, an optical recording layer of a thickness of 1,000 Å composed of GdTbFe ternary amorphous magnetic material. Subsequently the vacuum chamber was evacuated to a pressure of $4\times10^{-4}$Pa, then argon gas was introduced to a pressure of $4\times10^{-1}$Pa, and a sputtering operation was conducted with a second target of tungsten nitride positioned in said vacuum chamber to obtain a tungsten nitride layer of a thickness of 2,000 Å on said recording layer.

EXAMPLE 2

An iron-free glass of 1 inch square was placed as a substrate in an RF sputtering unit, and a sputtering operation was conducted with a complex target of Fe, Gd and Tb as in the Example 1 to form a recording layer of a thickness of 1,000 Å on said substrate. Subsequently the vacuum chamber was evacuated to a pressure of $4\times10^{-4}$Pa, then nitrogen gas was introduced to a pressure of $4\times10^{-1}$Pa and a sputtering operation was conducted with a second target of tungsten nitride to form a tungsten nitride layer of a thickness of 2,000 Å on said recording layer.

EXAMPLE 3

In an RF sputtering unit, a vacuum chamber was evacuated to a pressure of $4\times10^{-4}$Pa, and argon gas was introduced to a pressure of $4\times10^{1}$Pa. Then a sputtering operation was conducted with a substrate composed of polymethyl methacrylate (PMMA) and with a first target of tungsten nitride to obtain a tungsten nitride layer of a thickness of 200 Å on said substrate. Subsequently a sputtering operation was conducted with a second complex target composed of Fe, Gd and Tb as in the Example 1 to obtain a recording layer of a thickness of 1,000 Å. Then the vacuum chamber was evacuated to a pressure of $4\times10^{-4}$Pa, argon gas was introduced to a pressure of $4\times10^{-1}$Pa, and a sputtering operation was conducted with said first target to obtain a tungsten nitride layer of a thickness of 2,000 Å on said recording layer.

EXAMPLE 4

In an RF sputtering unit, a vacuum chamber was evacuated to a pressure of $4\times10^{-4}$Pa, and nitrogen gas was introduced to a pressure of $4\times10^{-1}$Pa. Then a sputtering operation was conducted with a substrate composed of polymethyl methacrylate (PMMA) and with a first target composed of tungsten nitride to obtain a tungsten nitride layer of a thickness of 200 Å on said substrate. Subsequently a sputtering operation was conducted with a second complex target composed of Fe, Gd and Tb as in the Example 1 to obtain a recording layer of a thickness of 1,000 Å. Then the vacuum chamber was evacuated to a pressure of $4\times10^{-4}$Pa, nitrogen gas was introduced to a pressure of $4\times10^{-1}$Pa, and a tungsten nitride layer of a thickness of 2,000 Å was formed with said first target on said recording layer.

Figure 2:
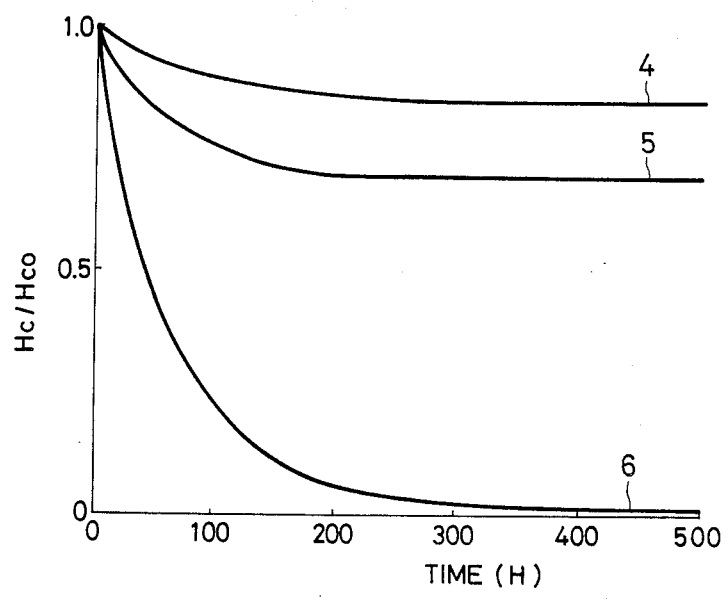

The optical recording medii prepared according to the Examples 1 to 4 were subjected to a corrosion test in a thermostat chamber of 70° C., 80%RH, and the obtained results are shown in FIGS. 1 and 2. In FIGS. 1 and 2, the abscissa indicates the test time in hours while the ordinate indicates the change in coercive force Hc as a ratio to the initial coercive force HcO, and a larger loss in the coercive force indicates a larger degree of corrosion.

In FIG. 1, a curve 1 indicates the test result obtained with the recording medium of the Example 1, while curves 2 and 3 indicate test results on reference examples. The reference example represented by the curve 3 was obtained by forming an optical recording layer of a thickness of 1,000 Å composed of GdTbFe ternary amorphous magnetic material as in the Example 1 on a glass substrate but lacking the protective layer, while the reference example represented by the curve 2 was obtained by evaporating an SiO protective layer of a thickness of 3,000 Å on the recording layer of the reference example represented by the curve 3. In this manner the use of tungsten nitride protective layer provides a significantly improved anticorrosive property in comparison with the conventional optical recording medii. In a similar test, the optical recording medium of the Example 2 provided substantially same results as those of the Example 1.

In FIG. 2, a curve 4 represents the test results obtained with the medium of the Example 3, while curves 5 and 6 represent the test results obtained with medii of reference examples. The reference example represented by the curve 6 was obtained by forming an optical recording layer of a thickness of 1,000 Å composed of GdTbFe ternary amorphous magnetic material as in the Example 3 on a PMMA substrate but lacking the protective layer, while the reference example represented by the curve 5 was obtained by forming an SiO layer of a thickness of 200 Å on a PMMA substrate, then forming a GdTbFe recording layer of a thickness of 1,000 Å thereon and further evaporating an SiO protective layer of a thickness of 3,000 Å thereon. FIG. 2 also indicates the effectiveness of the tungsten nitride protective layer for improving the anticorrosive property. In a similar test, the optical recording medium of the Example 4 provided substantially same results as those of the Example 3.

EXAMPLES 5 TO 23

Optical recording medii were prepared with zirconium nitride, titanium nitride, niobium nitride, vanadium nitride or tantalum nitride for the protective layer instead of tungsten nitride employed in the Examples 1 to 4. Compositions of said medii are summarized in Tab. 1. The optical recording layer was composed of GdTbFe ternary amorphous magnetic layer of a thickness of 1,000 Å, and the nitride layer was formed by RF sputtering in the presence of a gas, shown as gas atmosphere in Tab. 1, at a pressure of $4\times10^{-1}$Pa.

TABLE 1

| | Structure | Gas atmosphere at nitride layer formation |
|---|---|---|
| Example 5: | Glass substrate/recording layer/zirconim nitride layer (2,000 Å) | Argon gas |
| Example 6: | Glass substrate/recording layer/zirconium nitride layer (2,000 Å) | Nitrogen gas |
| Example 7: | PMMA substrate/zirconium nitride layer (200 Å)/recording layer/zirconium nitride layer (2,000 Å) | Argon gas |
| Example 8: | PMMA substrate/zirconium nitride layer (200 Å)/recording layer/zirconium nitride layer (2,000 Å) | Nitrogen gas |
| Example 9: | Glass substrate/recording layer/zirconium nitride layer (2,000 Å) | Argon gas |
| Example 10: | Glass substrate/recording layer/zirconium nitride layer (2,000 Å) | Nitrogen gas |
| Example 11: | PMMA substrate/titanium nitride substrate/titanium nitride layer (200 Å)/recording layer/titanium nitride layer (2,000 Å) | Nitrogen gas |
| Example 12: | Glass substrate/recording layer/niobium nitride layer (2,000 Å) | Argon gas |
| Example 13: | Glass substrate/recording layer/niobium nitride layer (2,000 Å) | Nitrogen gas |
| Example 14: | PMMA substrate/niobium nitride layer (200 Å)/ recording layer/niobium nitride layer (2,000 Å) | Argon gas |
| Example 15: | PMMA substrate/niobium nitride layer (200 Å)/ recording layer/niobium nitride layer (2,000 Å) | Nitrogen gas |
| Example 16: | Glass substrate/recording layer/vanadium nitride layer (2,000 Å) | Argon gas |
| Example 17: | Glass substrate/recording layer/vanadium nitride layer (2,000 Å) | Nitrogen gas |
| Example 18: | PMMA substrate/vanadium nitride layer (200 Å)/ recording layer/vanadium nitride layer (2,000 Å) | Argon gas |
| Example 19: | PMMA substrate/vanadium nitride layer (200 Å)/ recording layer/vanadium nitride layer (2,000 Å) | Nitrogen gas |
| Example 20: | Glass substrate/recording layer/tantalum nitride layer (2,000 Å) | Argon gas |
| Example 21: | Glass substrate/recording layer/tantalum nitride layer (2,000 Å) | Nitrogen gas |
| Example 22: | PMMA substrate/tantalum nitride layer (200 Å)/ recording layer/tantalum nitride layer (2,000 Å) | Argon gas |
| Example 23: | PMMA substrate/tantalum nitride layer (200 Å)/ recording layer/tantalum nitride layer (2,000 Å) | Nitrogen gas |

The optical recording medii of the above-mentioned Examples 5-23 were subjected to corrosion test in a thermostatic tank of 70° C., 85%RH. The obtained results were same as shown in FIGS. 1 and 2, in which tungsten nitride was employed as the protective layer. Stated differently, the anticorrosive property of optical recording medium can be significantly improved also by the use of zirconium nitride, titanium nitride, niobium nitride, vanadium nitride or tantalum nitride as the protective layer.

Figure 3:
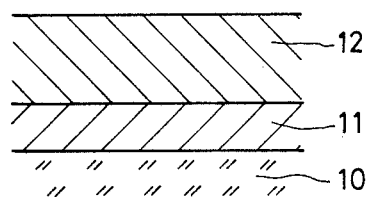
FIGS. 3 and 4 are cross-sectional views schematically showing embodiments of the optical recording medium according to the present invention.
Figure 4:
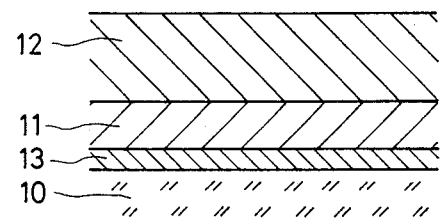

The structures of the foregoing embodiments are schematically represented in FIG. 3, in which a recording layer 11 and a nitride layer 12 constituting a protective layer are formed in succession on a substrate 10, and in FIG. 4 in which a nitride layer 13, a recording layer 11 and another nitride layer 12 are formed in succession on a substrate 10.

Figure 5:
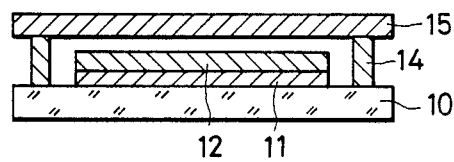
FIGS. 5 to 7 are similar views showing variations of the present invention.
Figure 6:
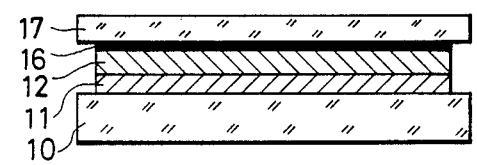

The present invention is however not limited to such embodiments but is subject to various variations. For example, the optical recording layer is not limited to a magnetooptical recording magnetic layer but can be composed of any optical recording material as already explained in the description of the prior art. Also it is possible to further improve the anticorrosive property by an air sandwich structure shown in FIG. 5, in which the recording layer 11 of an optical recording medium constructed according to the present invention is enclosed in an inert gas sealed in a space between substrates 10, 15 mutually separated by a spacer 14, or by a laminated structure shown in FIG. 6 in which the protective layer 12 is adhered for example to a glass plate 17 by means of an adhesive material 16.

Figure 7:
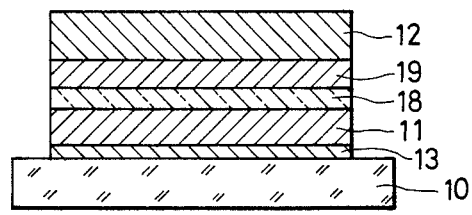

Further according to the concept of the present invention, a magnetooptical recording medium may assume a structure shown in FIG. 7 which is provided, in the order from bottom to top on a transparent substrate 10, with a nitride protective layer 13, a recording layer 11 of a thickness of 100-300 Å, a dielectric layer 18 composed of SiO or SiO$_2$, a reflective layer 19 composed of Al or Cu, and a nitride protective layer 12.

The thickness of the nitride protective layer 13 at the substrate 10 has to be less than 1,500 Å in consideration of the absorption by the protective layer 13 on the light to be introduced through the substrate 10, and is preferably in a range from 100 to 1,500 Å. The protective layer 13 at the substrate 10 can be made thinner than the protective layer 12 at the opposite side because of the protective effect of the substrate 10.

The thickness of the protective layer 12 opposite to the substrate 10 is preferably in a range from 1,000 to 5,000 Å, more preferably in a range from 2,000 to 3,000 Å.

Figure 8:
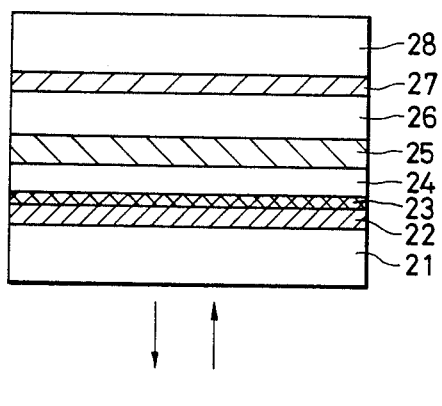
FIGS. 8 to 11 are schematic cross-sectional views showing examples of the construction of the respective layers of the opto-magnetic recording mediums of the present invention.

In the example shown in FIG. 8, reference numeral 21 designates a write-in read-out side substrate, reference numeral 22 denotes a recording layer, reference numeral 23 designates a layer of chromium nitride which represents chromium containing nitrogen atoms in a chemically coupled state, reference numeral 24 denotes an interference layer, reference numeral 25 designates a reflecting layer, reference numeral 26 denotes a protective layer, reference numeral 27 designates an adhesive layer, and reference numeral 28 denotes a protective substrate.

The substrate 21 is formed of plastic or glass, and on the substrate 21, the recording surface 22 of magnetism resisting force of 100-4000 Oe such as GdTbFe is formed to a thickness of 50-500 Å by a method such as sputtering, whereafter the layer 23 of chromium nitride is formed by vacuum evaporation or sputtering.

The thickness of the layer 23 is set to such a thickness that the deterioration of the C/N ratio is small and that is most effective to prevent the magnetic recording layer 22 in contact with the layer 23 from being deteriorated by oxygen or moisture in the air or in the interference layer 24. The value of the thickness is usually in the range of 5-5000 Å, and preferably in range of 20-200 Å. If the thickness is less than 5 Å, the preventing effect will not be sufficient, and a film having a thickness exceeding 5000 Å is practically unnecessary.

Other auxiliary layers, namely, the interference layer 24 of SiO, $MgF_2$, $Ta_2O_5$, $Nb_2O_5$, $Al_2O_3$, AlN or $Si_3N_4$ and the reflecting layer 25 of Cu, Al or Au may be provided by the usually known evaporation method or like method, but the protective layer 26 may be provided by applying an organic molecular film or by evaporating an inorganic material such as an oxide, a sulfide, a fluoride or a nitride or a metal material. The protective substrate 28 consisting of plastic or a metal such as aluminum is layered through the adhesive layer 7.

Figure 9:
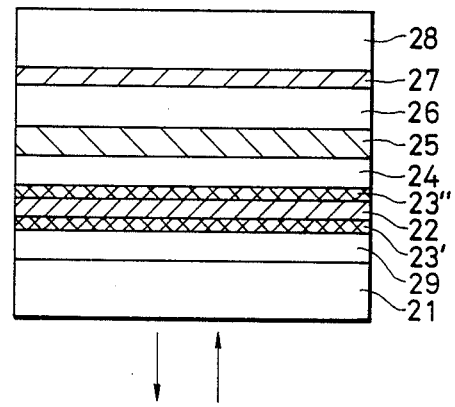

In the example of the construction shown in FIG. 9, an anti-reflection layer 29 is provided on the substrate 21 to improve the C/N ratio, and layers 23′ and 23″ of chromium nitride are provided on the opposite sides of the recording layer 22. In the case of this example of the construction, one of the layers 23′ and 23″ may be omitted if a sufficient protecting effect is obtained for the magnetic recording layer even if one of the layers 23′ and 23″ is omitted. Also, the anti-reflection layer 29 may be of a multi-layer structure.

Figure 10:
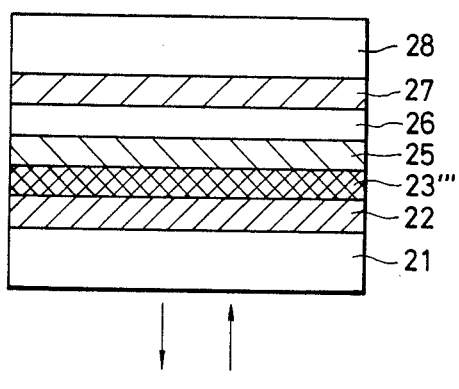

In the example of the construction shown in FIG. 10, a layer 23‴ of chromium nitride is endowed also with the function of an interference layer, and in this case, the thickness of the layer 23‴ is usually in the range of 50-10000 Å, and preferably in the range of 100-5000 Å.

Figure 11:
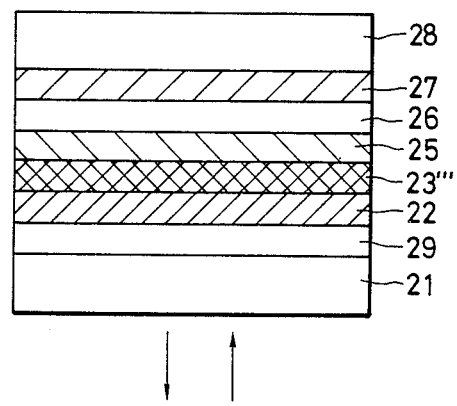

In the example of the construction shown in FIG. 11, an anti-reflection layer 29 for improving the C/N ratio is provided between the substrate 21 and the recording layer 22 in the construction of FIG. 10.

Several examples of the construction have been shown above, whereas the present invention is not restricted to these examples, but a film of chromium containing nitrogen atoms in a chemically coupled state may be provided on at least one side of the recording layer. Also, it is preferable from the viewpoint of the effect of protecting the recording layer to provide this film in contact with the recording layer as shown in the above-described example of the construction, wherein it is not requisite to the present invention to provide this film in contact with the recording layer, but another auxiliary layer may be interposed therebetween. Also, the recording medium of the present invention can be applied to the so-called cemented structure or the air sandwich structure in which inert gas is developed. It is also possible to provide various auxiliary layers such as layers into which an index mark and a tracking mark have been written or to use a write-in side substrate whose surface has been processed into a porous layer. The adhesive layer for cementing the substrate with the recording layer to the protective substrate may be replaced with a corrosion resisting layer containing a volatile corrosion inhibitor, a corrosion resisting layer containing an oil-soluble corrosion inhibitor, a layer containing fine metal powder, a layer containing a desiccating agent or a layer containing a basic organic substance.

The film of chromium containing nitrogen atoms in a chemically coupled state may preferably be formed by vacuum evaporation or sputtering as described previously with respect to the method of forming the layer 23 of chromium nitride of FIG. 8. Describing the method more specifically, reaction sputtering, high frequency sputtering, DC magnetron sputtering, triple-pole sputtering, ion beam sputtering, ion introduction and reaction evaporation are applicable. A particularly preferable method is the reaction sputtering using chromium, chromium nitride or a mixture of chromium nitride and chromium as a sputtering target and using ammonia, nitrogen or a mixture of nitrogen and hydrogen as reaction gas.

The present invention will hereinafter be described more specifically by showing some examples thereof.

EXAMPLE 24

An opto-magnetic recording medium of the structure shown in FIG. 8 was made in the following manner.

A flat glass plate having a diameter of 200 mm and a thickness of 1.2 mm was used as the substrate 21, and GdTbFeCo was formed into a film of a thickness of 200 Å thereon by sputtering using a high frequency sputtering apparatus, and the magnetic recording layer 22 was formed. Subsequently, chromium nitride was formed into a film of a thickness of 100 Å thereon by reaction-sputtering Cr in ammonia gas by the use of the same high frequency sputtering apparatus, and the corrosion preventing layer 23 was formed. Then, by the use of a vacuum evaporation apparatus, SiO was evaporated to a thickness of 400 Å as the interference layer 24, and then Al was evaporated to a thickness of 500 Å as the reflecting layer 25. Further thereon, SiO was evaporated to a thickness of 3000 Å as the protective layer 26. This was cemented to the protective glass substrate 28 by means of the adhesive layer 27, whereby an opto-magnetic recording medium was made. Measurement of the magnetism resisting force was carried out for the evaluation of the magnetic characteristic of this opto-magnetic recording medium. Also, for the evaluation of the overall dynamic characteristic as an opto-magnetic recording medium, recording was effected at a write-in output 7 mW, a duty ratio 50% and a recording frequency 4 MHz by the use of a semiconductor laser of a wavelength 820 nm while said opto-magnetic recording medium was rotated at 1800 rpm, and this was reproduced at a reproducing output 3 mW by the use of the semiconductor laser, whereby the C/N ratio was measured. As a result, Hc was 1000 Oe and 54 dB was obtained as C/N. Further, this opto-magnetic recording medium was placed into a constant-temperature constant-humidity tank of temperature 45° C. and relative humidity 90% and a corrosion resistance test was carried out for 1000 hours, whereby the variations in the magnetism resisting force and the C/N ratio were examined. For comparison, a comparative sample 1 made in a manner similar to Embodiment 1 with the exception that the corrosion preventing layer 23 was not provided and the film thickness of the interference layer was 500 Å, and a comparative sample 2 made in a manner similar to Embodiment 1 with the exception that a layer of aluminum nitride having a film thickness of 100 Å was provided as the corrosion preventing layer 23 were prepared and were tested at the same time.

As a result of the test, the C/N ratio immediately after the medium was made was 54 dB for the comparative sample 1 having no corrosion preventing layer, whereas the C/N ratio was aggravated to 50 dB for the comparative sample 2 in which aluminum nitride of 100 Å was provided for corrosion prevention, but the C/N ratio was 54 dB for the medium of the present embodiment using chromium nitride as the corrosion preventing layer and there was no aggravation of the characteristic of the medium of the present embodiment. Also, the C/N ratio after the medium was left in an environment of 45° C. and relative humidity 90% for 1000 hours was 37 dB and 46 dB for the comparative samples 1 and 2, respectively, whereas the C/N ratio was 50 dB for the medium of the present embodiment in which chromium nitride of 100 Å was provided as the corrosion preventing layer. It was confirmed that by thus providing a corrosion preventing layer of chromium nitride, the corrosion resistance could be greatly improved without the characteristic being aggravated.

EXAMPLE 25

The medium shown in FIG. 9 was made in a manner similar to Example 24. In this Example, the film thicknesses of the corrosion preventing layers 23' and 23" consisting of chromium nitride were 200 Å and the anti-reflection layer 29 consisted of SiO of 800 Å. The construction of the other layers were the same as those in Example 24. The C/N ratio of this medium immediately after it was made was 53 dB, and the C/N ratio thereof after a corrosion resistance test at 45° C. and relative humidity 90% was carried out for 1000 hours was 50 dB.

EXAMPLE 26

The medium shown in FIG. 10 was made in a manner similar to Example 24. In this example, the film thickness of the corrosion preventing and interference layer consisting of chromium nitride was 400 Å and the other layers were similar to those in Example 24. The C/N ratio of this medium immediately after it was made was 52 dB, and the C/N ratio thereof after a corrosion resistance test at 45° C. and relative humidity 90% was carried out for 1000 hours was 51 dB.

EXAMPLE 27

The medium shown in FIG. 11 was made in a manner similar to Example 26. In this example, the anti-reflection layer was chromium nitride of 900 Å, and the other layers were the same as those in Example 26. The C/N ratio of this medium immediately after it was made was 53 dB, and the C/N ratio thereof after a corrosion resistance test at 45° C. and relative humidity 90% was carried out for 1000 hours was 53 dB.

As described above, the corrosion resistance of the recording medium can be remarkably improved by providing on the substrate at least one layer of film of chromium having nitrogen atoms in a chemically coupled state. The effect is particularly remarkable where the corrosion preventing layer is provided in contact with the recording layer.

While the description of the invention has been made with respect to opto-magnetic recording mediums, the present invention is also effective for the improvement of the corrosion resistance of other optical recording mediums.

As explained in the foregoing, the present invention allows significant improvement of the anticorrosive property of an optical recording medium by forming a layer of nitride of a substance selected from a group consisting of tungsten, zirconium, titanium, niobium, vanadium, tantalum and chromium on one side or both sides of the recording layer.

What is claimed is:
1. An opto-magnetic recording medium comprising:
   (a) a transparent substrate;
   (b) an opto-magnetic recording layer overlying said transparent substrate; and
   (c) a protective layer composed of a nitride of a substance selected from the group consisting of tungsten, zirconium, titanium, niobium, vanadium, tantalum, and chromium and formed at least between said substrate and said recording layer, wherein the thickness of said protective layer formed between said recording layer and said substrate is equal to or less than 1500 Å so that a light beam directed through said substrate is transmitted to said recording layer.
2. A recording medium according to claim 1, wherein said substrate is composed of a glass plate.
3. A recording medium according to claim 1, wherein said substrate is composed of a plate of polymethyl methacrylate (PMMA).
4. A recording medium according to claim 1, wherein said magnetic layer is composed of GdTbFe ternary amorphous magnetic layer.
5. A recording medium according to claim 1, wherein said protective layer is composed of nitride of titanium or niobium, which is formed by reactive vacuum evaporation.
6. A recording medium according to claim 1, wherein said recording layer has a thickness approximately equal to 1,000 Å.
7. An optical recording medium according to claim 1, wherein another said protective layer is formed on the outside of said recording layer and has a thickness in a range of from 2000 Å to 3000 Å.
8. A recording medium according to claim 1, wherein said protective layer is provided at both sides of said recording layer, and the thickness of the protective layer adjacent to said substrate is approximately equal to 200 Å while the thickness of the protective layer positioned opposite to said substrate is in a range from 2,000 to 3,000 Å.
9. A recording medium according to claim 1, wherein said protective layer is formed by high frequency (RF) sputtering.
10. A recording medium according to claim 9, wherein said protective layer is formed by reactive RF sputtering.
11. A recording medium according to claim 9, wherein said RF sputtering is conducted in an atmosphere of argon gas.
12. A recording medium according to claim 9, wherein said RF sputtering is conducted in an atmosphere of nitrogen gas.
13. A recording medium according to claim 1, comprising, in an order from bottom to top on said substrate, said nitride protective layer, said recording layer, a dielectric layer, a reflective layer and said nitride protective layer.
14. A recording medium according to claim 13, wherein said recording layer has a thickness in a range from 100 to 300 Å.
15. A recording medium according to claim 13, wherein said dielectric layer is composed of SiO or $SiO_2$.
16. A recording medium according to claim 13, wherein said reflective layer is composed of Al or Cu.
17. A recording medium according to claim 1, wherein said protective layer is composed of a film of chromium containing nitrogen atoms in a chemically coupled state.
18. A recording medium according to claim 17, wherein said film consists of chromium nitride.
19. An recording medium according to claim 17, comprising, in an order from bottom to top on said substrate, an anti-reflection layer, said protective layer, said recording layer, another said protective layer, an interference layer, a reflecting layer, a protective layer of SiO or $SiO_2$, an adhesive layer and another substrate.

* * * * *

UNITED STATES PATENT AND TRADEMARK OFFICE
CERTIFICATE OF CORRECTION

PATENT NO. : 4,939,023

DATED : July 3, 1990

INVENTOR(S) : Hiroshi OMATA, et al.

It is certified that error appears in the above-identified patent and that said Letters Patent is hereby corrected as shown below:

Title page:

AT [56] Foreign Patent Documents:

Right column, first patent document,

"59169996 4/1982 Japan." should read

--57-169996 10/1982 Japan.--

COLUMN 1:

Line 25, "medii" should read --media,--.

Line 43, "medii" should read --media,--.

Line 44, "medii" should read --media,--.

Line 48, "therefore" should read --thereof--.

Line 51, "medii" should read --media--.

Line 52, "medii" should read --media--.

UNITED STATES PATENT AND TRADEMARK OFFICE
CERTIFICATE OF CORRECTION

PATENT NO. : 4,939,023

DATED : July 3, 1990

INVENTOR(S) : Hiroshi OMATA, et al.

Page 2 of 3

It is certified that error appears in the above-identified patent and that said Letters Patent is hereby corrected as shown below:

COLUMN 2:

Line 62, "medii" should read --media--.

COLUMN 3:

Line 44, "$4\times10^{1}Pa$" should read --$4\times10^{-1}Pa$--.

COLUMN 4:

Line 7, "medii" should read --media--.

Line 14, "HcO," should read --Hco,--.

Line 32, "medii." should read --media.--

Line 38, "medii" should read --media--.

Line 58, "medii" should read --media--.

Line 63, "medii" should read --media--.

UNITED STATES PATENT AND TRADEMARK OFFICE
CERTIFICATE OF CORRECTION

PATENT NO. : 4,939,023

DATED : July 3, 1990

INVENTOR(S) : Hiroshi OMATA, et al.

It is certified that error appears in the above-identified patent and that said Letters Patent is hereby corrected as shown below:

COLUMN 5:

Line 62, "medii" should read --media--.

COLUMN 7:

Line 16, "7." should read --27.--.

COLUMN 10:

Line 62, "An" should read --A--.

Signed and Sealed this

Fourth Day of May, 1993

Attest:

MICHAEL K. KIRK

Attesting Officer

Acting Commissioner of Patents and Trademarks